US012623464B2

(12) United States Patent
Furukawa et al.

(10) Patent No.: US 12,623,464 B2
(45) Date of Patent: May 12, 2026

(54) INKJET RECORDING DEVICE

(71) Applicant: KYOCERA Document Solutions Inc., Osaka (JP)

(72) Inventors: Noriaki Furukawa, Osaka (JP); Shunsuke Yamasaki, Osaka (JP); Kaori Kitayama, Osaka (JP); Yuko Yano, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 144 days.

(21) Appl. No.: 18/847,758

(22) PCT Filed: Mar. 14, 2023

(86) PCT No.: PCT/JP2023/009810
§ 371 (c)(1),
(2) Date: Sep. 17, 2024

(87) PCT Pub. No.: WO2023/182070
PCT Pub. Date: Sep. 28, 2023

(65) Prior Publication Data

US 2025/0206029 A1 Jun. 26, 2025

(30) Foreign Application Priority Data

Mar. 24, 2022 (JP) ................................ 2022-049046

(51) Int. Cl.

| | |
|---|---|
| ***B41J 2/175*** | (2006.01) |
| ***B41J 2/17*** | (2006.01) |
| ***B41J 2/18*** | (2006.01) |

(52) U.S. Cl.
CPC ......... *B41J 2/17596* (2013.01); *B41J 2/1728* (2024.05); *B41J 2/18* (2013.01)

(58) Field of Classification Search
None
See application file for complete search history.

(56) References Cited

U.S. PATENT DOCUMENTS

2019/0299621 A1 10/2019 Kashimoto

FOREIGN PATENT DOCUMENTS

JP 2019-171648 A 10/2019

*Primary Examiner* — Alejandro Valencia
(74) *Attorney, Agent, or Firm* — Stein IP, LLC

(57) ABSTRACT

In an inkjet recording device (1), an intermediate flow passage (53) is connected to a downstream section of a first flow passage (89), and is in communication with a recording head (52) and a second flow passage (90). A communicating flow passage (54) includes a first branch flow passage (54A) that supplies ink from the intermediate flow passage (53) to the recording head (52), a second branch flow passage (54B) that causes the ink to circulate from the recording head (52) to the second flow passage (90), and a third branch flow passage (54C) that causes the ink to flow from the intermediate flow passage (53) to the second flow passage (90). Opening/closing valves (96), (55A), (55B), (55C) are respectively provided to a third flow passage (91) and the first branch flow passage (54A), the second branch flow passage (54B), and the third branch flow passage (54C).

4 Claims, 4 Drawing Sheets

INKJET RECORDING DEVICE

CROSS-REFERENCE TO RELATED APPLICATIONS

This application is a National Stage of International Application No. PCT/JP2023/009810, filed Mar. 14, 2023, which claims the benefit of Japanese Application No. 2022-049046, filed Mar. 24, 2022, in the Japanese Patent Office, the disclosures of which are incorporated herein by reference.

TECHNICAL FIELD

The present invention relates to an inkjet recording device.

BACKGROUND ART

An inkjet recording device includes a recording head for ejecting ink onto a paper sheet or other recording medium to record images. For example, at shipping from a factory, there are some cases, with the inkjet recording device, where the ink supply side is emptied for prevention of liquid leaks while the recording head side is filled with transport liquid for quality assurance of flow passages. For this occasion, in the inkjet recording device, the ink supply side and the recording head side may be provided so as to be fittable and removable by means of a coupling or the like.

The conventional inkjet recording device disclosed in patent document 1 includes a removable coupling for each of two places, one on a supply path along which ink supplied from a supply unit to recording heads passes, and the other on a circulation path along which ink returning from the recording heads to the supply unit passes. An upstream-side portion on the supply path and a downstream-side portion on the circulation path, which are to be connected to the two couplings, respectively, are connected to each other by a bypass path that allows the two sides to be communicated with and intercepted from each other.

As a result, at a product arrival time of the inkjet recording device, ink can be circulated to and filled into the supply unit not via recording heads but via the bypass path. Thereafter, connecting the two couplings with each other to make the supply path and the circulation path communicated with each other, and moreover replacing reservation liquid of the recording heads with ink, makes it possible to suppress involvement of foams in the ink of the recording heads.

CITATION LIST

Patent Literature

Patent Document 1: JP 2019-171648 A

SUMMARY OF INVENTION

Technical Problem

In the above-described conventional inkjet recording device, a clamp for opening and closing ink flow passages is provided on the bypass path. Then, for replacement with different ink, replacement work is carried out while ink quantity within a sub-ink tank for ink storage is being decreased gradually. However, because the ink in the bypass path cannot be replaced, the clamp opening/closing operation by manual work needs to be exercised again and again.

Also, for reduction of ink consumption during the replacement, ink needs to be drawn out from a supply unit. In this situation, it would be necessary to remove the coupling, with which the supply unit and the recording heads are connected together, in order to prevent meniscus collapses of ink within the recording heads, and to discharge ink exclusively by using suction jigs or the like. As seen in these cases, there have been problems in terms of more laborious work, increases in ink consumption, and increases in required time, involved in replacement with different ink.

The present invention having been accomplished in view of the above-described issues, an object of the invention is to provide an inkjet recording device that makes it possible to realize more convenience of work, decreases in ink consumption, and reduction in required time during replacement work with different ink.

Solution to Problem

In order to solve the above problems, an inkjet recording device of the present invention includes a recording head, an ink container, a first sub-tank, a second sub-tank, a circulating pump, a pressurizing part, a depressurizing part, a syringe, a first flow passage, a second flow passage, a third flow passage, an intermediate flow passage, and a communicating flow passage. The recording head, which is provided one or more in number, has a plurality of nozzles for ejecting ink onto a recording medium. The ink container contains the ink supplied to the recording head. The first sub-tank temporarily stores the ink supplied from the ink container. The second sub-tank temporarily stores the ink supplied from the first sub-tank. The circulating pump moves the ink from the first sub-tank to the second sub-tank. The pressurizing part pressurizes interior of the second sub-tank to supply the ink from the second sub-tank to the recording head. The depressurizing part depressurizes interior of the first sub-tank to circulate the ink from the recording head to the first sub-tank. The syringe, into which the ink flows from the second sub-tank and from which the ink flows out toward the recording head, is enabled to apply to the ink a maintenance pressure higher than a recording pressure applied to the ink by the pressurizing part. Along the first flow passage, the ink flows from the first sub-tank to the circulating pump to the second sub-tank to the syringe and up to the recording head. Along the second flow passage, the ink circulates from the recording head to the first sub-tank. The third flow passage couples together an upstream side of the recording head in an ink flow direction of the first flow passage and a downstream side of the recording head in an ink flow direction of the second flow passage. The intermediate flow passage is connected to a downstream point in the ink flow direction of the first flow passage so as to be communicated with the recording head and the second flow passage. The communicating flow passage includes a first branch flow passage for supplying the ink from the intermediate flow passage to the recording head, a second branch flow passage for circulating the ink from the recording head to the second flow passage, and a third branch flow passage for circulating the ink from the intermediate flow passage to the second flow passage. The third flow passage as well as the first branch flow passage, the second branch flow passage, and the third branch flow passage composing the communicating flow passage are each equipped with an opening/closing valve.

Advantageous Effects of Invention

According to the configuration of the invention, exercising proper opening-and-closing sequence of the opening/ closing valves provided in the third flow passage, the first branch flow passage, the second branch flow passage, and the third branch flow passage, respectively, makes it implementable to make replacement work more convenient and realize reduction of ink consumption as well as reduction in required time during ink replacement work with different ink.

DESCRIPTION OF EMBODIMENTS

Hereinafter, an embodiment of the present invention will be described with reference to the accompanying drawings. It should be noted that the invention is not limited to the following contents.

Figure 1:
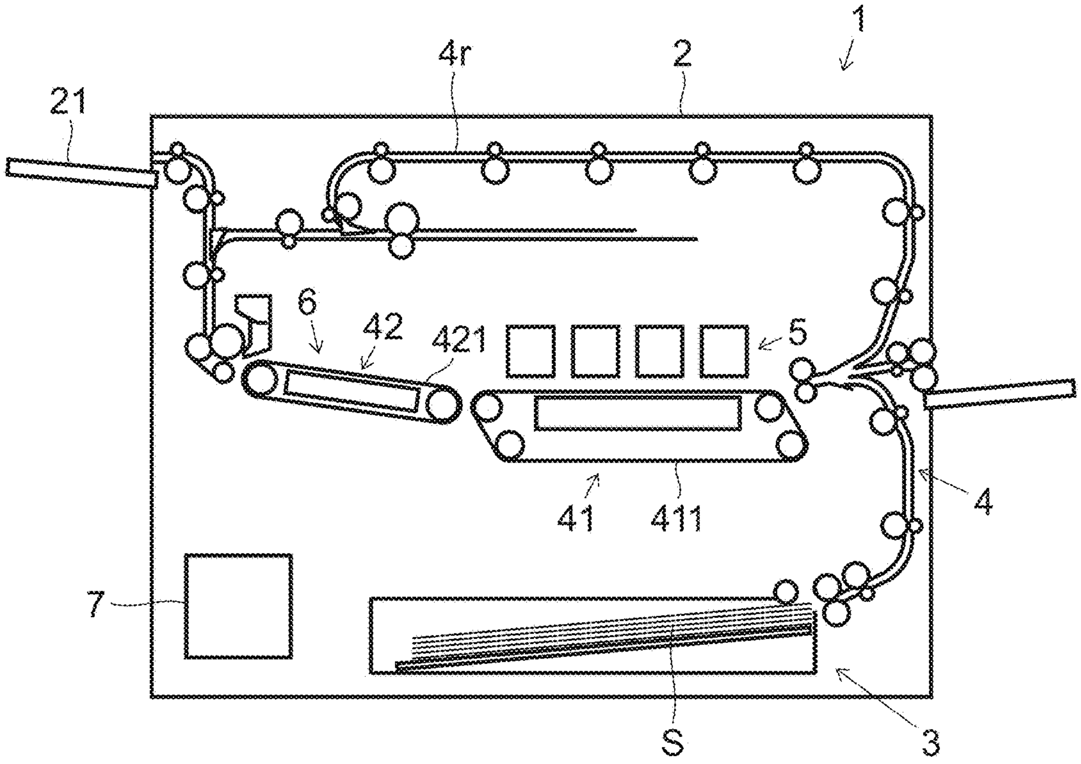
FIG. 1 is a schematic cross-sectional front view of an inkjet recording device according to one embodiment of the present invention.
Figure 2:
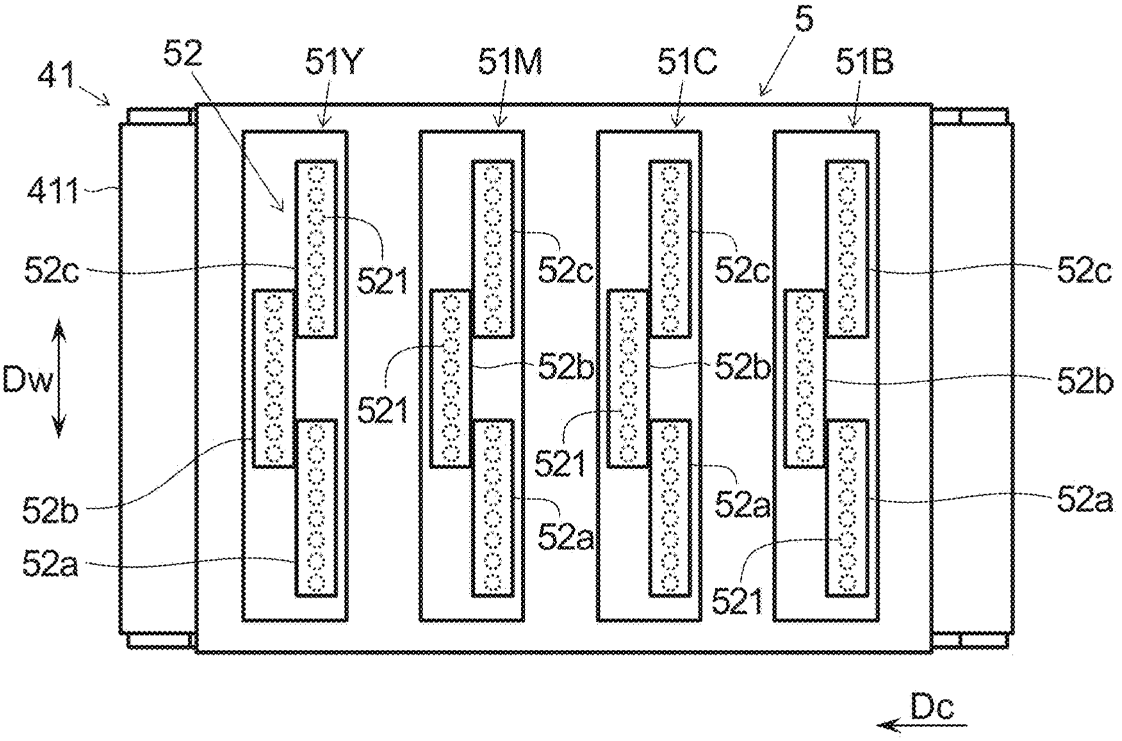
FIG. 2 is a plan view of around a recording part in the inkjet recording device of FIG. 1.
Figure 3:
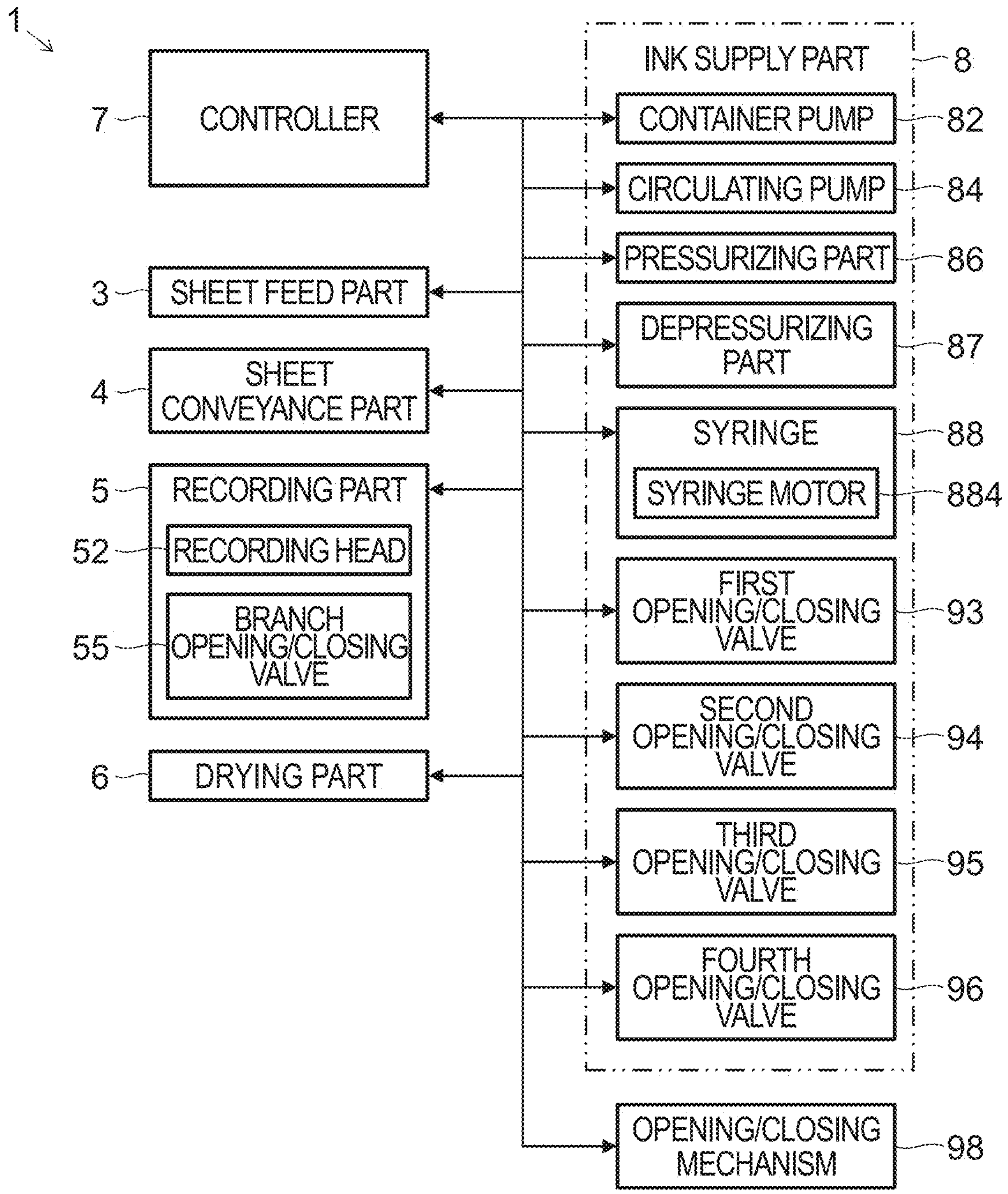
FIG. 3 is a block diagram of the inkjet recording device of FIG. 1.

FIG. 1 is a schematic cross-sectional front view of an inkjet recording device 1 according to one embodiment. FIG. 2 is a plan view of around a recording part 5 in the inkjet recording device 1 of FIG. 1. FIG. 3 is a block diagram of the inkjet recording device 1 of FIG. 1. The inkjet recording device 1 is, for example, an inkjet recording type printer. The inkjet recording device 1, as shown in FIGS. 1, 2 and 3, includes a device main body 2, a sheet feed part 3, a sheet conveyance part 4, a recording part 5, a drying part 6, and a controller 7.

The sheet feed part 3 is placed below in the device main body 2, as an example. The sheet feed part 3, containing a plurality of paper sheets (recording medium S, separates and feeds out sheets one by one for recording.

The sheet conveyance part 4 is placed downstream of the sheet feed part 3 in a sheet conveyance direction to convey a sheet S fed out from the sheet feed part 3. The sheet conveyance part 4 conveys the sheet S to the recording part 5 and the drying part 6, further discharging the recorded and dried sheet S onto a sheet discharge part 21. The sheet conveyance part 4 has a reversal conveyance part 4*r*, as an example. When double-sided recording is executed, the sheet conveyance part 4 assorts the sheet S, which has been subjected to recording and drying of its first surface, to the reversal conveyance part 4*r*, and further, after a switchover of conveyance direction, conveys the reversed sheet S again to the recording part 5 and the drying part 6.

The sheet conveyance part 4 includes a first belt conveyance part 41 and a second belt conveyance part 42. The first belt conveyance part 41 has a first conveyor belt 411 formed into an endless shape. The second belt conveyance part 42 has a second conveyor belt 421 formed into an endless shape. The first belt conveyance part 41 and the second belt conveyance part 42 suck-and-hold and convey the sheet S on their upper surfaces (top surfaces), respectively. The first belt conveyance part 41 is placed below the recording part 5 to convey the sheet S. The second belt conveyance part 42 is placed in the drying part 6, downstream of the first belt conveyance part 41 in the sheet conveyance direction, to convey the sheet S.

The recording part 5 is placed downstream of the sheet feed part 3 in the sheet conveyance direction so as to be opposed to the first belt conveyance part 41. The recording part 5 is placed above the first conveyor belt 411 with a specified clearance so as to be opposed to the sheet S sucked-and-held and conveyed to the upper surface of the first conveyor belt 411. That is, the recording part 5 is opposed the sheet S conveyed by the sheet conveyance part 4.

The recording part 5, as shown in FIG. 2, holds head units 51B, 51C, 51M, 51Y corresponding to four colors of black, cyan, magenta, yellow, respectively. The head units 51B, 51C, 51M, 51Y are successively juxtaposed along a sheet conveyance direction De such that their longitudinal directions are parallel to a sheet widthwise direction Dw perpendicular to the sheet conveyance direction Dc. In addition, because the four head units 51B, 51C, 51M, 51Y are similar in basic configuration, identification symbols 'B', 'C', 'M', and 'Y' representing individual colors may be omitted, hereinafter, except cases where particular limitations by those signs are needed.

Each of the individual-color head units 51 includes a recording head 52 of the line type inkjet method. In each-color head unit 51, a plurality of recording heads 52 (e.g., three (52*a*, 52*b*, 52*c*)) are arrayed in a staggered pattern along the sheet widthwise direction Dw.

The recording head 52 has a plurality of ink ejection nozzles 521 at its bottom portion. The plurality of ink ejection nozzles 521 are arrayed along the sheet widthwise direction Dw so as to be enabled to eject ink over an entire recording region on the sheet S. That is, the recording head 52 has a plurality of ink ejection nozzles 521 for ejecting ink onto the sheet S. The recording part 5 ejects ink successively from the recording heads 52 of the four-color head units 51B, 51C, 51M, 51Y toward the sheet S conveyed by the first conveyor belt 411 to record a full-color image or a monochrome image on the sheet S.

The drying part 6 is placed downstream of the recording part 5 in the sheet conveyance direction, and equipped with the second belt conveyance part 42. The sheet S on which the ink image has been recorded by the recording part 5 is subjected to drying of ink while the sheet S is sucked-and-held and conveyed by the second conveyor belt 421 in the drying part 6.

The controller 7 includes a CPU, a storage part, and other electronic circuits and electronic components (none shown). Based on control programs and data stored in the storage part, the CPU controls operations of the individual component elements provided in the inkjet recording device 1 to execute processing related to functions of the inkjet recording device 1. The sheet feed part 3, the sheet conveyance part 4, the recording part 5 and the drying part 6, upon receiving instructions individually from the controller 7, execute recording on the sheet S in linkage with one another. The storage part is composed of, for example, a combination of program ROM (Read Only Memory), data ROM, or other nonvolatile storage devices, and RAM (Random Access Memory) or other volatile storage devices.

Figure 4:
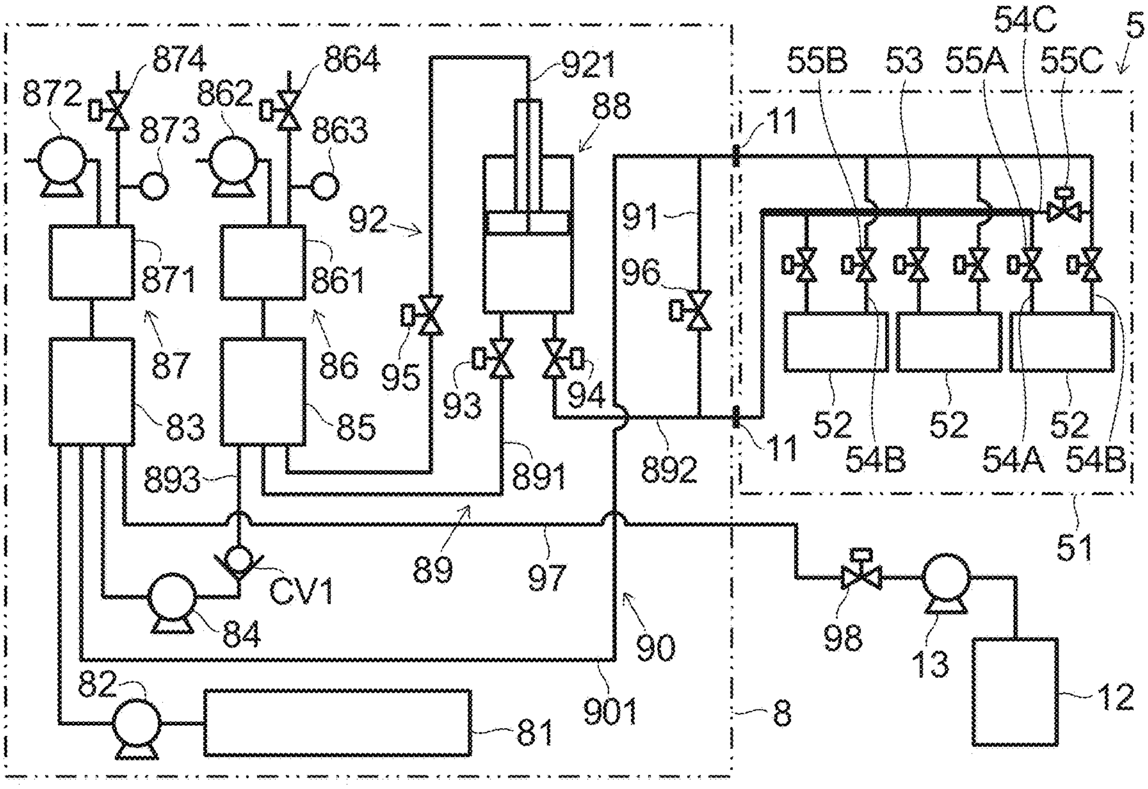
FIG. 4 is an explanatory view of around an ink supply part in the inkjet recording device of FIG. 1.
Figure 5:
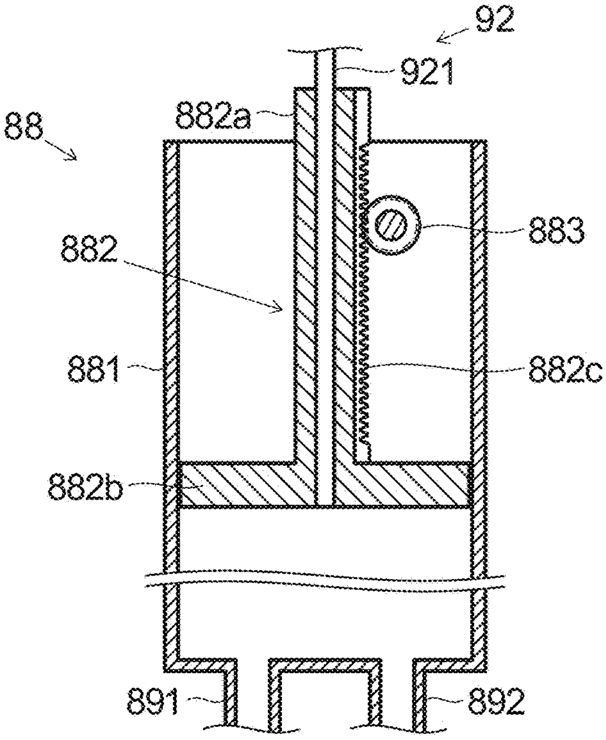
FIG. 5 is a sectional view of a syringe in the ink supply part of FIG. 4.
Figure 6:
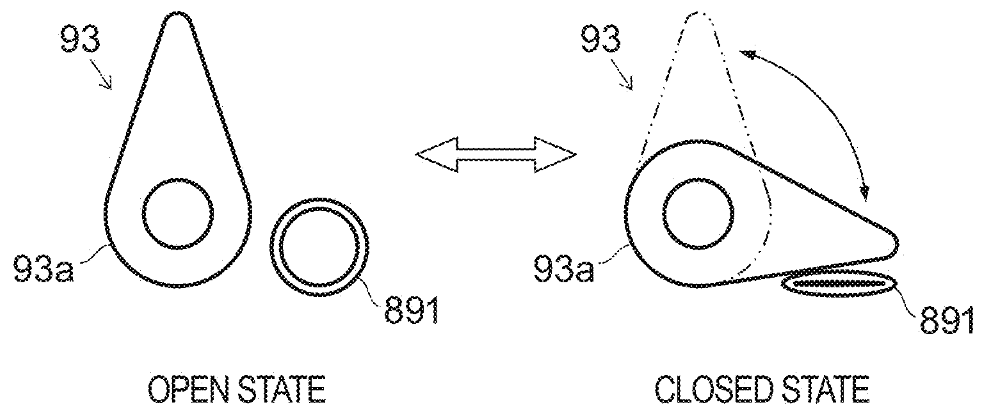
FIG. 6 is an explanatory view of an opening/closing valve in the ink supply part of FIG. 4.
Figure 7:
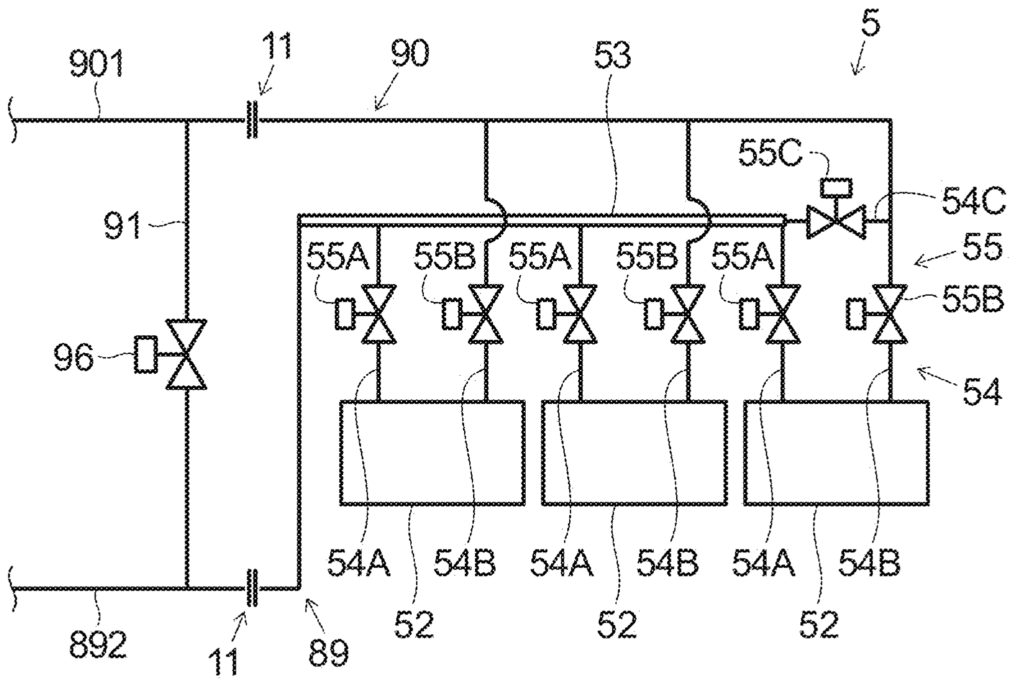
FIG. 7 is an enlarged explanatory view of around an intermediate flow passage and a communicating flow passage of FIG. 4.

Next, a configuration of an ink supply part 8 of the inkjet recording device 1 will be described with reference to FIGS. 4 to 6. FIG. 4 is an explanatory view of around the ink supply part 8 in the inkjet recording device of FIG. 1. FIG. 5 is a sectional view of a syringe 88 in the ink supply part 8 of FIG. 4. FIG. 6 is an explanatory view of an opening/closing valve in the ink supply part 8 of FIG. 4. FIG. 7 is an enlarged explanatory view of around an intermediate flow passage 53 and a communicating flow passage 54 of FIG. 4.

The inkjet recording device 1 includes the ink supply part 8. The ink supply part 8 is provided for each of the four-color head units 51. Hereinafter, notation of identification signs representing the individual colors will be omitted. The ink supply part 8 and the head units 51 are coupled to each other by a removable coupling 11. Contained in the coupling 11 are valve members (not shown) for opening ink flow passages in a connected state and closing the ink flow passages in an isolated state.

The ink supply part 8 includes an ink container 81, a container pump 82, a first sub-tank 83, a circulating pump 84, a second sub-tank 85, a pressurizing part 86, a depressurizing part 87, a syringe 88, a first flow passage 89, a second flow passage 90, and a third flow passage 91. Further, the ink supply part 8 includes a fourth flow passage 92, a first opening/closing valve 93, a second opening/closing valve 94, and a third opening/closing valve. Also, the recording part 5 includes an intermediate flow passage 53 and a communicating flow passage 54.

The ink container 81 is removably provided in the device main body 2. The ink container 81 contains ink to be supplied to the recording heads 52.

The container pump 82 is placed downstream of the ink container 81 in an ink flow direction. The container pump 82 sucks up ink from within the ink container 81 and ejects ink toward the first sub-tank 83. Operations of the container pump 82 are controlled by the controller 7.

The first sub-tank 83 is placed downstream of the container pump 82 in the ink flow direction. The first sub-tank 83 temporarily store ink supplied from the ink container 81. The first sub-tank 83 is equipped with an ink level sensor (not shown). The ink level sensor may be any one selected from, for example, optical sensors, electrostatic sensors, electrode sensors, differential pressure sensors, float sensors and the like, and is operable to detect an ink level within the first sub-tank 83.

The controller 7 receives a detection signal of the ink level sensor of the first sub-tank 83. When an ink level within the first sub-tank 83 detected by the ink level sensor has become lower than a specified value, the controller 7 controls the container pump 82 to supply ink from the ink container 81 to the first sub-tank 83. Supply quantity of ink from the ink container 81 and the first sub-tank 83 is controlled depending on drive time of the container pump 82, as an example. In a case where the ink quantity within the first sub-tank 83 detected by the ink level sensor is lower than a specified value even when drive time of the container pump 82 has reached a predetermined time, the controller 7 decides that the ink quantity within the ink container 81 has emptied.

The circulating pump 84 is placed downstream of the first sub-tank 83 in the ink flow direction. The circulating pump 84 moves ink from the first sub-tank 83 to the second sub-tank 85. The circulating pump 84 may be selected, for example, from among such liquid-dedicated pumps as tube pumps and diaphragm pumps. Operations of the circulating pump 84 are controlled by the controller 7.

The second sub-tank 85 is placed downstream of the circulating pump 84 in the ink flow direction. The second sub-tank 85 temporarily store ink supplied from the first sub-tank 83. As in the first sub-tank 83, an ink level sensor (not shown) is provided in the second sub-tank 85 to detect an ink level within the second sub-tank 85.

The controller 7 receives a detection signal of the ink level sensor of the second sub-tank 85. When an ink level within the second sub-tank 85 detected by the ink level sensor has become lower than a specified value, the controller 7 controls the circulating pump 84 to move ink from the first sub-tank 83 to the second sub-tank 85. Ink quantity moved from the first sub-tank 83 to the second sub-tank 85 is controlled depending on drive time of the circulating pump 84, as an example.

The pressurizing part 86 is provided in combination with the second sub-tank 85. The pressurizing part 86 pressurizes interior of the second sub-tank 85 to supply ink from the second sub-tank 85 to the recording heads 52. Operations of the pressurizing part 86 are controlled by the controller 7.

The pressurizing part 86 includes a pressurizing chamber 861, a pressurizing pump 862, a pressurizing sensor 863, and a pressurizing-chamber opening/closing mechanism 864. The pressurizing chamber 861 has a specified capacity and communicates with the second sub-tank 85. The pressurizing pump 862 makes air flow into the pressurizing chamber 861 to pressurize the chamber. The pressurizing sensor 863 detects a pressure within the pressurizing chamber 861. The pressurizing-chamber opening/closing mechanism 864 opens and closes air flow passages between interior of the pressurizing chamber 861 and the atmosphere.

Based on a detection signal of the pressurizing sensor 863, the controller 7 controls operations of the pressurizing pump 862 and the pressurizing-chamber opening/closing mechanism 864 in an analog fashion and in real time. According to this configuration, it is implementable to suitably pressurize interior of the second sub-tank 85 so that ink can be supplied from the second sub-tank 85 to the recording heads 52 with high efficiency.

The depressurizing part 87 is provided in combination with the first sub-tank 83. The depressurizing part 87 depressurizes interior of the first sub-tank 83 to circulate ink from the recording heads 52 to the first sub-tank 83. Operations of the depressurizing part 87 are controlled by the controller 7.

The depressurizing part 87 includes a depressurizing chamber 871, a depressurizing pump 872, a depressurizing sensor 873, and a depressurizing-chamber opening/closing mechanism 874. The depressurizing chamber 871 has a specified capacity and communicates with the first sub-tank 83. The depressurizing pump 872 makes air low out from interior of the depressurizing chamber 871 to depressurize the chamber. The depressurizing sensor 873 detects a pressure of the depressurizing chamber 871. The depressurizing-chamber opening/closing mechanism 874 opens and closes air flow passages between the interior of the depressurizing chamber 871 and the atmosphere.

Based on a detection signal of the depressurizing sensor 873, the controller 7 controls operations of the depressurizing pump 872 and the depressurizing-chamber opening/closing mechanism 874 in an analog fashion and in real time. According to this configuration, it is implementable to suitably depressurize interior of the first sub-tank 83 so that ink can be circulated from the recording heads 52 to the first sub-tank 83 with high efficiency.

In addition, the pressurizing part 86 and the depressurizing part 87 are not limited to the above-described configuration. As the pressurizing part 86 and the depressurizing part 87, for example, regulators are also usable, and a negative-pressure generation device as well as a pressurizing pump may also be used.

The syringe 88 is placed downstream of the second sub-tank 85 in the ink flow direction as well as upstream of the recording heads 52 in the ink flow direction. Into the syringe 88, ink flows from the second sub-tank 85, and from the syringe 88, ink flows out toward the recording heads 52. As shown in FIG. 5, the syringe 88 includes a cylinder portion 881, and a plunger 882.

The cylinder portion 881 is formed into cylindrical shape and so placed that its axis extends in an up/down direction. An upper end of the cylinder portion 881 is opened. A lower end of the cylinder portion 881 is closed, and a first tube 891 and a second tube 892 of the later-described first flow passage 89 are connected to the cylinder portion 881, where the first tube 891 extends from the second sub-tank 85 side while the second tube 892 extends toward the recording heads 52. The first tube 891 and the second tube 892 are communicated with the interior of the cylinder portion 881.

The plunger 882 is inserted to inside of the cylinder portion 881 through an upper-end opening of the cylinder portion 881. The plunger 882 includes an axial portion 882*a*, and a gasket portion 882*b*. The axial portion 882*a* is so formed that its axis extends in the up/down direction. The gasket portion 882*b* is placed at a lower end of the axial portion 882*a*. The gasket portion 882*b* is formed into a cylindrical shape extending along an inner circumferential surface of the cylinder portion 881, with its outer circumferential surface set in close contact with the inner circumferential surface of the cylinder portion 881. As a result, ink within the cylinder portion 881 is prevented from leaking out upward of the gasket portion 882*b*.

A fifth tube 921 of a later-described fourth flow passage 92 is inserted at a radial center portion of the plunger 882. The fifth tube 921 is communicated with interior of the cylinder portion 881. Air residing within the cylinder portion 881, i.e. upward of ink within the syringe 88 and downward of the gasket portion 882*b*, is discharged upward via the fifth tube 921. In addition, the fourth flow passage 92 extends up to the second sub-tank 85.

The fourth flow passage 92 extends from the syringe 88 to the second sub-tank 85. The fourth flow passage 92 is an air flow passage for discharging air within the syringe 88 to the second sub-tank 85. A third opening/closing valve 95 is placed on the fifth tube 921 of the fourth flow passage 92. The third opening/closing valve 95 opens and closes the fourth flow passage 92. The third opening/closing valve 95 is provided by a solenoid valve, as an example, and its opening and closing is controlled by the controller 7. The controller 7 opens the third opening/closing valve 95 at a time of discharge of air within the syringe 88.

A rack 882*c* is formed on a side face the axial portion 882*a*. The rack 882*c* has a plurality of teeth successively juxtaposed in the up/down direction, with which a syringe driving gear 883 is to be engaged. The syringe driving gear 883, which is connected to a syringe motor 884 (see FIG. 3), obtains motive power from the syringe motor 884 so as to be rotated forward and reverse. Forward and reverse rotation of the syringe driving gear 883 allows the plunger 882 to be reciprocatively moved along the up/down direction. Operations of the syringe motor 884 are controlled by the controller 7.

During image recording onto the sheet S, a recording pressure is applied to ink by the pressurizing part 86. Under this condition, for example during the course of maintenance or the like, the controller 7 instructs the syringe motor 884 to move the plunger 882 downward at high speed, thereby thrusting ink out from within the syringe 88, with a result that a maintenance pressure higher than the recording pressure can be applied to ink. That is, the syringe 88 is enabled to apply to the ink a maintenance pressure higher than the recording pressure applied to the ink by the pressurizing part 86.

The first flow passage 89 is an ink flow passage along which ink flows from the first sub-tank 83 to the circulating pump 84 to the second sub-tank 85 to the syringe 88 and up to the recording heads 52. The first flow passage 89 includes the first tube 891 extending from the second sub-tank 85 to the syringe 88, the second tube 892 extending from the syringe 88 to the recording heads 52, and a third tube 893 extending from the first sub-tank 83 to the second sub-tank 85. A check valve CVI is placed on the third tube 893. The check valve CVI prevents ink from flowing reverse from downstream to upstream side as viewed in the ink flow direction of the first flow passage 89.

On the first tube 891 of the first flow passage 89, the first opening/closing valve 93 is placed upstream of the syringe 88 in the ink flow direction. It is noted that the first tube 891 is a tube made from rubber, as an example, so being deformable by bending, flexing, or the like. As shown in FIG. 6, the first opening/closing valve 93 includes an opening/closing cam 93*a*, and an opening/closing motor (not shown).

The opening/closing cam 93*a* adjoins the first tube 891. The opening/closing cam 93*a* is formed into a wedge shape as viewed in the axial direction of the first tube 891. The opening/closing cam 93*a* is supported so as to be rotatable about a rotational axis parallel to the axis of the first tube 891. The opening/closing cam 93*a* is rotated by the opening/closing motor, thereby swinging so as to make a fore end side of its wedge shape put into contact with or separate from the first tube 891.

When the first opening/closing valve 93 is set to an open state, the controller 7 controls the opening/closing motor to rotate the opening/closing cam 93*a* so that the opening/closing cam 93*a* is set to such an angle as to be in no contact with the first tube 891 or keep the first tube 891 from being deformed. As a result of this, at the site of the first opening/closing valve 93, ink flows within the first tube 891. When the first opening/closing valve 93 is set to a closed state, the controller 7 controls the opening/closing motor to rotate the opening/closing cam 93*a*, thereby making the opening/closing cam 93*a* put into contact with the first tube 891, at such an angle that the first tube 891 is crushed. As a result of this, at the site of the first opening/closing valve 93, ink is blocked from flowing within the first tube 891. The first opening/closing valve 93 opens and closes the first flow passage 89 between the first sub-tank 83 and the syringe 88.

The second opening/closing valve 94 is placed on the second tube 892 of the first flow passage 89. Configuration and operations of the second opening/closing valve 94 are similar to those of the first opening/closing valve 93 described above, so those description being omitted. The second opening/closing valve 94 is controlled in its opening and closing by the controller 7. The second opening/closing valve 94 opens and closes the first flow passage 89 between the syringe 88 and the recording heads 52.

The second flow passage 90 is an ink flow passage along which ink circulates from the recording heads 52 to the first sub-tank 83. The second flow passage 90 includes a fourth tube 901 extending from the recording heads 52 to the first sub-tank 83.

The third flow passage 91 couples an upstream side of the recording heads 52 in the ink flow direction of the first flow passage 89, and a downstream side of the recording heads 52 in the ink flow direction of the second flow passage 90, to each other. In more detail, the third flow passage 91 couples the second tube 892 of the first flow passage 89 and the fourth tube 901 of the second flow passage 90 to each other at a vicinity of the coupling 11 within the ink supply part 8.

The intermediate flow passage 53 is placed above the recording heads 52, as an example, in this embodiment. The intermediate flow passage 53 is connected to a downstream portion of the first flow passage 89 in the ink flow direction. The intermediate flow passage 53 is communicated with the recording heads 52 and the second flow passage 90.

The communicating flow passage 54 includes a first branch flow passage 54A, a second branch flow passage 54B, and a third branch flow passage 54C. The first branch flow passage 54A is connected, at one end portion in the ink flow direction, to the intermediate flow passage 53, and connected, at the other end portion, to the recording heads 52, thus allowing ink to be supplied from the intermediate flow passage 53 to the recording heads 52. The second branch flow passage 54B is connected, at one end portion in the ink flow direction, to the recording heads 52, and connected, at the other end portion, to the second flow passage 90, thus allowing ink to circulate from the recording heads 52 to the second flow passage 90. The third branch flow passage 54C is connected, at one end portion in the ink flow direction, to the intermediate flow passage 53, and connected, at one end portion in the ink flow direction, to the intermediate flow passage 53, and connected, at the other end portion, to the second flow passage 90, thus allowing ink to circulate from the intermediate flow passage 53 to the second flow passage 90.

Then, the third flow passage 91 includes a fourth opening/closing valve 96. The fourth opening/closing valve 96 opens and closes the flow of ink in the third flow passage 91. The fourth opening/closing valve 96 is provided by a solenoid valve, as an example, and controlled in its opening and closing by the controller 7.

Further, each of the first branch flow passage 54A, the second branch flow passage 54B and the third branch flow passage 54C composing the communicating flow passage 54 includes a branch opening/closing valve 55. In more detail, the branch opening/closing valve 55 includes branch opening/closing valves 55A, 55B and 55C. The branch opening/closing valves 55A, 55B and 55C open and close the flow of ink in the first branch flow passage 54A, the second branch flow passage 54B, and the third branch flow passage 54C, respectively. The branch opening/closing valves 55A, 55B and 55C are each provided by a solenoid valve, as an example, and controlled in its opening and closing by the controller 7.

For example, during recording onto the sheet S, the fourth opening/closing valve 96 and the branch opening/closing valve 55C of the third branch flow passage 54C are closed. Also, during recording onto the sheet S, the branch opening/closing valve 55A of the first branch flow passage 54A and the branch opening/closing valve 55B of the second branch flow passage 54B are opened.

Also, during replacement with different ink, the fourth opening/closing valve 96 as well as the branch opening/closing valves 55A, 55B and 55C are changed over in their opening and closing depending on ink of which region in the ink flow passage is to be replaced. For instance, when ink of the third flow passage 91 is replaced, the fourth opening/closing valve 96 as well as the branch opening/closing valve 55C of the third branch flow passage 54C are opened, while the branch opening/closing valve 55A of the first branch flow passage 54A as well as the branch opening/closing valve 55B of the second branch flow passage 54B are closed. When ink of the recording heads 52 is replaced, the fourth opening/closing valve 96 as well as the branch opening/closing valve 55B of the second branch flow passage 54B and the branch opening/closing valve 55C of the third branch flow passage 54C are close, while the branch opening/closing valve 55A of the first branch flow passage 54A is opened.

According to the above-described configuration, when ink replacement with different ink is executed, it becomes implementable to appropriately change over the flow of ink by the fourth opening/closing valve 96 as well as the branch opening/closing valves 55A, 55B and 55C. As a result of this, ink replacement work becomes convenient, making it possible to accomplish reduction of ink consumption as well as reduction of required time on occasions of ink replacement.

Also, the inkjet recording device 1 of the above-described configuration includes the first sub-tank 83, the circulating pump 84, the second sub-tank 85, the pressurizing part 86, and the depressurizing part 87, where ink is circulated by using the two sub-tanks. Thus, with the inkjet recording device 1 of this ink circulation system, ink replacement work becomes more convenient, and it becomes practicable to fulfill reduction in ink consumption as well as reduction in required time during ink replacement work.

Also, the inkjet recording device 1 further includes a waste liquid flow passage 97, a waste liquid tank 12, and a waste liquid pump 13.

The waste liquid flow passage 97 is connected to one of the first sub-tank 83 and the second sub-tank 85. In this embodiment, the waste liquid flow passage 97 is connected to the first sub-tank 83.

The waste liquid tank 12 is connected to a downstream end of the waste liquid flow passage 97 in the ink flow direction. That is, waste liquid containing ink is conveyed to the waste liquid tank 12 via the first sub-tank 83 and the waste liquid flow passage 97.

The waste liquid pump 13 is placed upstream of the waste liquid tank 12 in the ink flow direction of the waste liquid flow passage 97. The waste liquid pump 13 moves ink to the waste liquid tank 12 via the waste liquid flow passage 97.

According to the above-described configuration, during replacement with different ink, ink within the ink supply part 8 can be thrown away to the waste liquid tank 12. Therefore, with the inkjet recording device 1, ink replacement efficiency can be enhanced, making it practicable to realize, even more effectively, reduction in ink consumption as well as reduction in required time during replacement work.

Also, the waste liquid flow passage 97 includes an opening/closing mechanism 98. The opening/closing mechanism 98 opens and closes flow of ink in the waste liquid flow passage 97. The opening/closing mechanism 98 is provided by an electromagnetic two-way valve, as an example, and is controlled in its opening and closing by the controller 7. According to this configuration, the waste liquid flow passage 97 can be closed by the opening/closing mechanism 98 during recording on the sheet S. As a result of this, reduction in ink consumption can be accomplished effectively.

Although an embodiment of this invention has been fully described hereinabove, yet the invention is not limited to the scope of this description and may be modified in various ways unless those modifications depart from the gist of the invention.

INDUSTRIAL APPLICABILITY

The present invention is applicable to inkjet recording devices.

The invention claimed is:

1. An inkjet recording device comprising:

one, or more, recording head having a plurality of nozzles for ejecting ink onto a recording medium;

an ink container for containing the ink supplied to the recording head;

a first sub-tank for temporarily storing the ink supplied from the ink container;

a second sub-tank for temporarily storing the ink supplied from the first sub-tank;

a circulating pump for moving the ink from the first sub-tank to the second sub-tank;

a pressurizing part for pressurizing interior of the second sub-tank to supply the ink from the second sub-tank to the recording head;

a depressurizing part for depressurizing interior of the first sub-tank to circulate the ink from the recording head to the first sub-tank;

a syringe into which the ink flows from the second sub-tank and from which the ink flows out toward the recording head, the syringe enabled to apply to the ink a maintenance pressure higher than a recording pressure applied to the ink by the pressurizing part;

a first flow passage along which the ink flows from the first sub-tank to the circulating pump to the second sub-tank to the syringe and up to the recording head;

a second flow passage along which the ink circulates from the recording head to the first sub-tank; and a third flow passage for coupling together an upstream side of the recording head in an ink flow direction of the first flow passage and a downstream side of the recording head in an ink flow direction of the second flow passage;

an intermediate flow passage connected to a downstream point in the ink flow direction of the first flow passage so as to be communicated with the recording head and the second flow passage; and a communicating flow passage including a first branch flow passage for supplying the ink from the intermediate flow passage to the recording head, a second branch flow passage for circulating the ink from the recording head to the second flow passage, and a third branch flow passage for circulating the ink from the intermediate flow passage to the second flow passage, wherein the third flow passage as well as the first branch flow passage, the second branch flow passage, and the third branch flow passage composing the communicating flow passage are each equipped with an opening/closing valve.

2. The inkjet recording device according to claim 1, further comprising:

a waste liquid flow passage connected to one of the first sub-tank and the second sub-tank;

a waste liquid tank connected to a downstream end of the waste liquid flow passage; and a waste liquid pump for moving the ink to the waste liquid tank via the waste liquid flow passage.

3. The inkjet recording device according to claim 2, wherein the waste liquid flow passage is equipped with an opening/closing mechanism.

4. The inkjet recording device according to claim 1, wherein the pressurizing part includes:

a pressurizing chamber which is communicated with the second sub-tank;

a pressurizing pump for making air flow into the pressurizing chamber to pressurize the chamber; and a pressurizing sensor for detecting an internal pressure of the pressurizing chamber, and the depressurizing part includes:

a depressurizing chamber which is communicated with the first sub-tank;

a depressurizing pump for making air flow out from within the depressurizing chamber to depressurize the chamber; and a depressurizing sensor for detecting an internal pressure of the depressurizing chamber.

* * * * *